United States Patent
Bertz et al.

(10) Patent No.: US 11,540,112 B1
(45) Date of Patent: Dec. 27, 2022

(54) POLICY ENFORCEMENT ACROSS WIRELESS COMMUNICATION NETWORKS OVER APPLICATION FUNCTIONS

(71) Applicant: T-Mobile Innovations LLC, Overland Park, KS (US)

(72) Inventors: Lyle T. Bertz, Lee's Summit, MO (US); Mark Richard Bales, Lee's Summit, MO (US); Tracy Lee Nelson, Overland Park, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 91 days.

(21) Appl. No.: 17/220,532

(22) Filed: Apr. 1, 2021

(51) Int. Cl.
*H04W 8/20* (2009.01)
*H04W 88/18* (2009.01)
*H04W 48/16* (2009.01)
*H04W 28/08* (2009.01)

(52) U.S. Cl.
CPC ......... *H04W 8/20* (2013.01); *H04W 28/0925* (2020.05); *H04W 48/16* (2013.01); *H04W 88/18* (2013.01)

(58) Field of Classification Search
CPC ... H04W 8/20; H04W 28/0925; H04W 48/16; H04W 88/18

USPC ........................................................ 455/418
See application file for complete search history.

(56) References Cited

U.S. PATENT DOCUMENTS

| 10,524,166 | B2 | 12/2019 | Youn et al. |
| 10,764,789 | B2 | 9/2020 | Qiao et al. |
| 10,812,977 | B2 | 10/2020 | Li et al. |
| 2019/0158408 | A1 | 5/2019 | Li et al. |
| 2019/0342851 | A1 | 11/2019 | Shan et al. |
| 2020/0112907 | A1 | 4/2020 | Dao et al. |

FOREIGN PATENT DOCUMENTS

WO    2018169382 A1    9/2018

*Primary Examiner* — Joel Ajayi

(57) ABSTRACT

A wireless communication network enforces a user policy for a User Equipment (UE) and directs another wireless communication network to enforce another user policy for another UE. In the wireless communication network, an Application Function (AF) receives the user policy from another AF in the other wireless communication network and transfers the user policy to the PCF. The PCF distributes the user policy to a Network Function (NF). The NF enforces the user policy. The PCF identifies the other user policy for the other UE and transfers the other user policy to the AF. The AF responsively transfers the other user policy to the other AF. The other AF transfers the other user policy to another PCF in the other wireless communication network. The other PCF distributes the other user policy to another NF in the other wireless communication network which enforces the other user policy.

20 Claims, 9 Drawing Sheets

POLICY ENFORCEMENT ACROSS WIRELESS COMMUNICATION NETWORKS OVER APPLICATION FUNCTIONS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMFs), Policy Control Functions (PCFs), and Application Functions (AFs).

A visiting wireless user device attaches to a wireless communication network over a RAN. A visiting UE is attached to a visited wireless communication network that is not its home wireless communication network. In the visited wireless communication network, a visited AMF queries a visited PCF for service rules for the visiting wireless user device. The visited PCF selects wireless service rules for the visiting wireless user device based on a roaming agreement between the visited wireless communication network and the home wireless communication network of the visiting wireless user device. Unfortunately, the PCFs ineffectively share policy data with one another. Moreover, the home PCFs ineffectively control the wireless service rules in the visited PCFs.

TECHNICAL OVERVIEW

A wireless communication network enforces a user policy for a User Equipment (UE) and directs another wireless communication network to enforce another user policy for another UE. In the wireless communication network, an Application Function (AF) receives the user policy from another AF in the other wireless communication network and transfers the user policy to the PCF. The PCF distributes the user policy to a Network Function (NF). The NF enforces the user policy. The PCF identifies the other user policy for the other UE and transfers the other user policy to the AF. The AF responsively transfers the other user policy to the other AF. The other AF transfers the other user policy to another PCF in the other wireless communication network. The other PCF distributes the other user policy to another NF in the other wireless communication network which enforces the other user policy.

DETAILED DESCRIPTION

Figure 1:
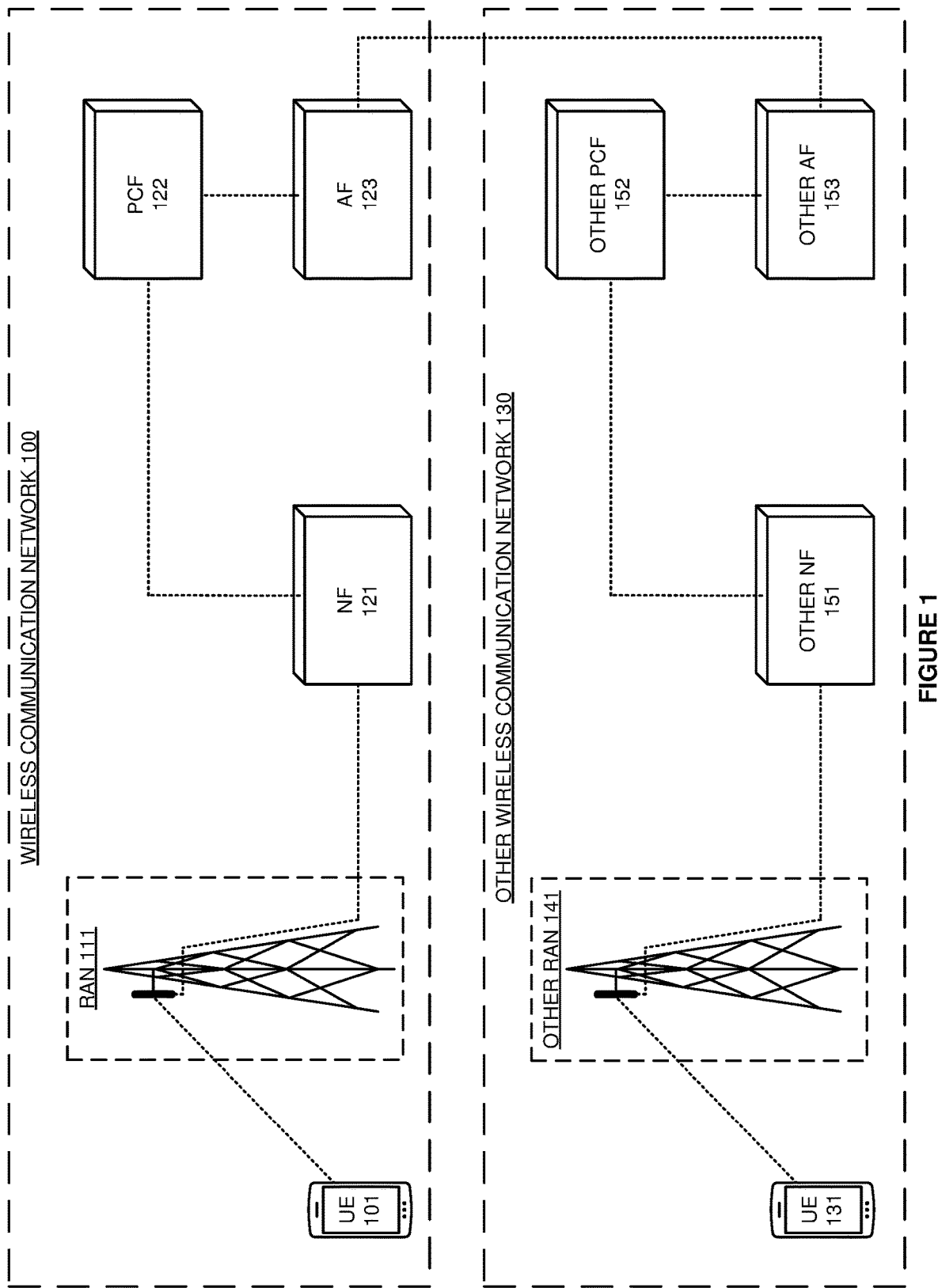
FIG. 1 illustrates a wireless communication network to enforce user policies across wireless communication networks.

FIG. 1 illustrates wireless communication network 100 to enforce user policies across wireless communication networks. Wireless communication network 100 delivers services to UE 101 like internet-access, machine communications, media-streaming, or some other wireless communications product. Wireless communication network 100 comprises UE 101, Radio Access Network (RAN) 111, Network Function (NF) 121, Policy Control Function (PCF) 122, and Application Function (AF) 123. Other wireless communication network 130 comprises UE 131, other RAN 141, other NF 151, other PCF 152, and other AF 153.

Various examples of network operation and configuration are described herein. In some examples, AF 123 receives a user policy from other AF 153 in other wireless communication network 130. Other AF 153 received the user policy from other PCF 152 in other wireless communication network 130. AF 123 transfers the user policy to PCF 122. PCF 122 distributes the user policy to NF 121. NF 121 enforces the user policy. PCF 122 identifies another user policy. PCF 122 transfers the other user policy to AF 123. AF 123 receives the other user policy from the PCF 122 and responsively transfers the other user policy to other AF 153. Other AF 153 transfers the other user policy to other PCF 152. Other PCF 152 responsively distributes the other user policy to other NF 151. Other NF 151 enforces the other user policy. Advantageously, PCF 122 effectively shares policy data with PCF 152. Moreover, the PCF 122 effectively controls the wireless service rules in PCF 152 when the two PCFs reside in different wireless communication networks.

UE 101, UE 131, RAN 111, and RAN 141 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. RAN 111, RAN 141, network functions 121-123, and network functions 151-153 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 101 and UE 131 comprise computers, phones, vehicles, sensors, robots, other types of data appliances with wireless and/or wireline communication circuitry. RAN 111 and RAN 141 are depicted as towers but RAN 111 and RAN 141 may use other mounting structures or no mounting structure at all. RAN 111 and RAN 141 may comprise Fifth Generation (5G) RANs, LTE RANs, gNodeBs, eNodeBs, NB-IoT access nodes, LP-WAN base stations, wireless relays, WIFI hotspots, ENET access nodes, Bluetooth access nodes, and/or other wireless or wireline network transceivers. UE 101, UE 131, RAN 111, and RAN 141 comprise antennas, amplifiers, filters, modulation, analog/digital interfaces, microprocessors, software, memories, transceivers, bus circuitry, and the like. NF 121 and other NF 151 comprise network functions like Access and Mobility Management functions (AMFs), Session Management Functions (SMFs), and the like. RAN 111, RAN 141, network functions 121-123, and network functions 151-153 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
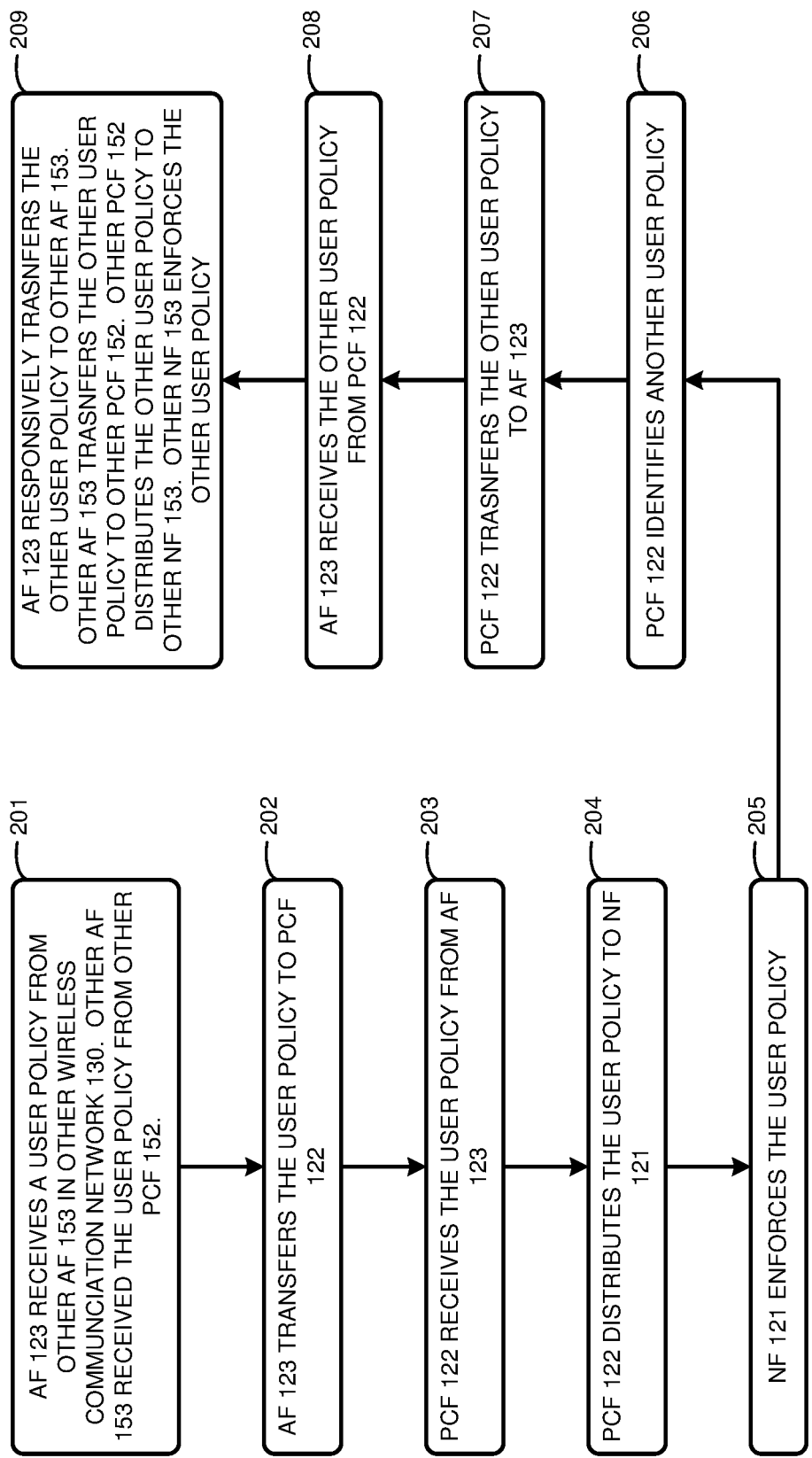
FIG. 2 illustrates an exemplary operation of the wireless communication network to enforce user policies across wireless communication networks.

FIG. 2 illustrates an exemplary operation of wireless communication network 100 to enforce user policies across wireless communication networks. The operation may vary in other examples. AF 123 receives a user policy from other AF 153 in other wireless communication network 130. Other AF 130 received the user policy from other PCF 152 (201). AF 123 transfers the user policy to PCF 122 (202). PCF 122 receives the user policy from AF 123 (203). PCF 122 distributes the user policy to NF 121 (204). NF 121 enforces the user policy (205). For example, the user policy may comprise a time-of-day usage rule for UE 101 and NF 121 may enforce the time-of-day usage rule for UE 101. PCF 122 identifies another user policy (206). PCF 122 transfers the other user policy to AF 123 (207). AF 123 receives the other user policy from PCF 122 (208). AF 123 responsively transfers the other user policy to other AF 153. Other AF 153 transfers the other user policy to other PCF 152. Other PCF 152 distributes the other user policy to other NF 153. Other NF 153 enforces the other user policy (209).

Figure 3:
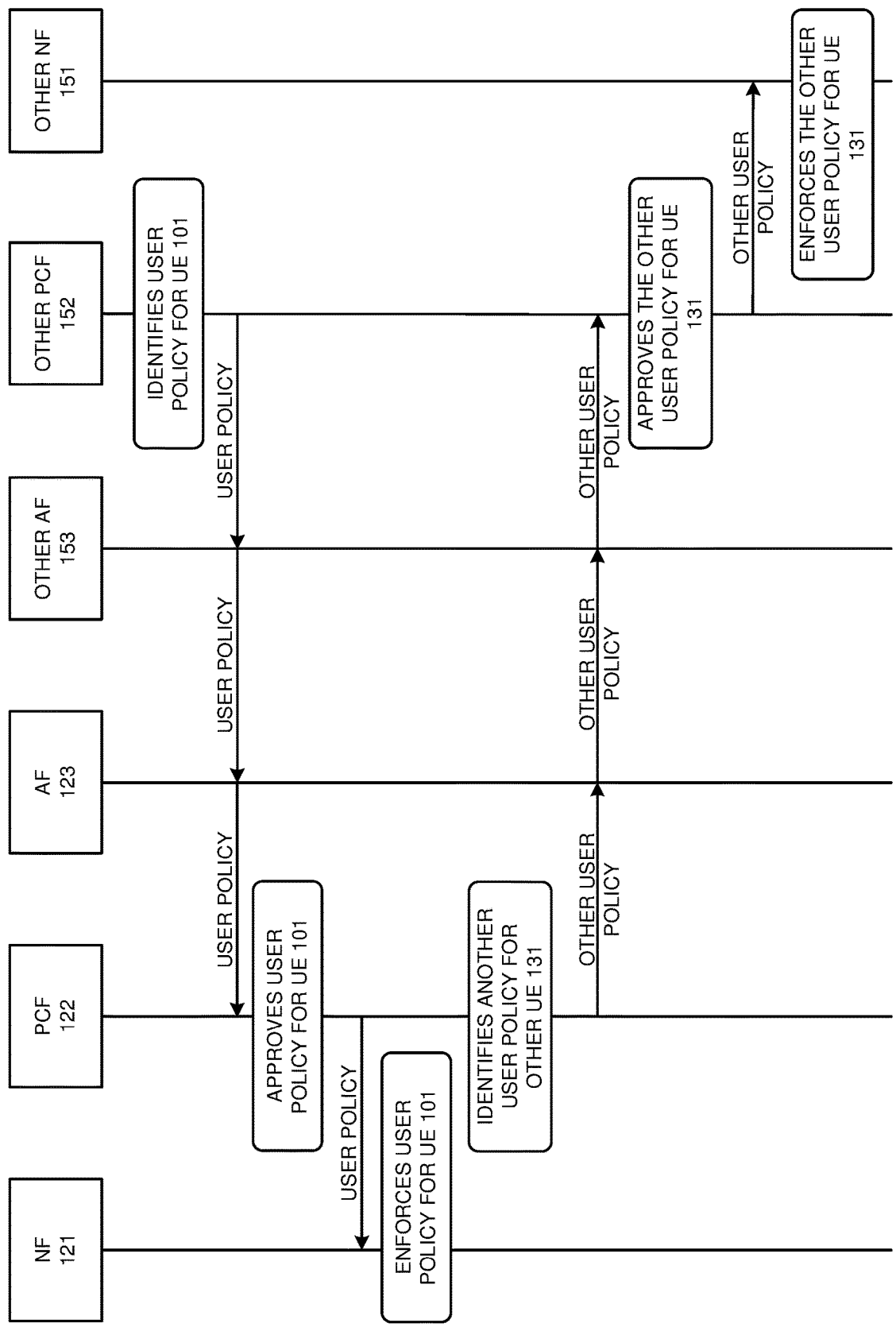
FIG. 3 illustrates another exemplary operation of the wireless communication network to enforce user policies across wireless communication networks.

FIG. 3 illustrates an exemplary operation of wireless communication network 100 to enforce user policies across wireless communication networks. The operation may vary in other examples. Other PCF 152 identifies a user policy for UE 101. For example, UE 101 may be visiting on wireless communication network 100 and other PCF 152 may identify a user policy for UE 101 based on the roaming agreement between the networks. Other PCF 152 transfers the user policy for UE 101 to other AF 153. Other AF 153 transfers the user policy for UE 101 to AF 123. AF 123 responsively transfers the user policy for UE 101 to PCF 122. PCF 122 approves the user policy for UE 101 and distributes the user policy to NF 121. NF 121 enforces the user policy for UE 101. For example, the policy may indicate authorized services for UE 101 and NF 121 may serve UE 101 with the authorized services and withhold unauthorized services from UE 101. In some examples, the user policy indicates a Local Breakout (LBO) rule for wireless communication networks 100 and 130.

PCF 122 identifies another user policy for UE 131. For example, UE 131's home network may be wireless communication network 100 and PCF 122 may receive indication that UE 131 is visiting on other wireless communication network 130. PCF 122 transfers the other user policy for UE 131 to AF 123. AF 123 transfers the other user policy for UE 131 to other AF 153. Other AF 153 transfers the other user policy for UE 131 to other PCF 152. Other PCF 152 approves the other user policy for UE 131 and distributes the other user policy to other NF 151. Other NF 151 enforces the other user policy for UE 131. In some examples, the user policies comprise default visiting policies for UEs 101 and 131. In some examples, the user policies comprise customized visiting policies for UEs 101 and 131. For example, the user policy for UE 101 may indicate a specific slice type for UE 101.

Figure 4:
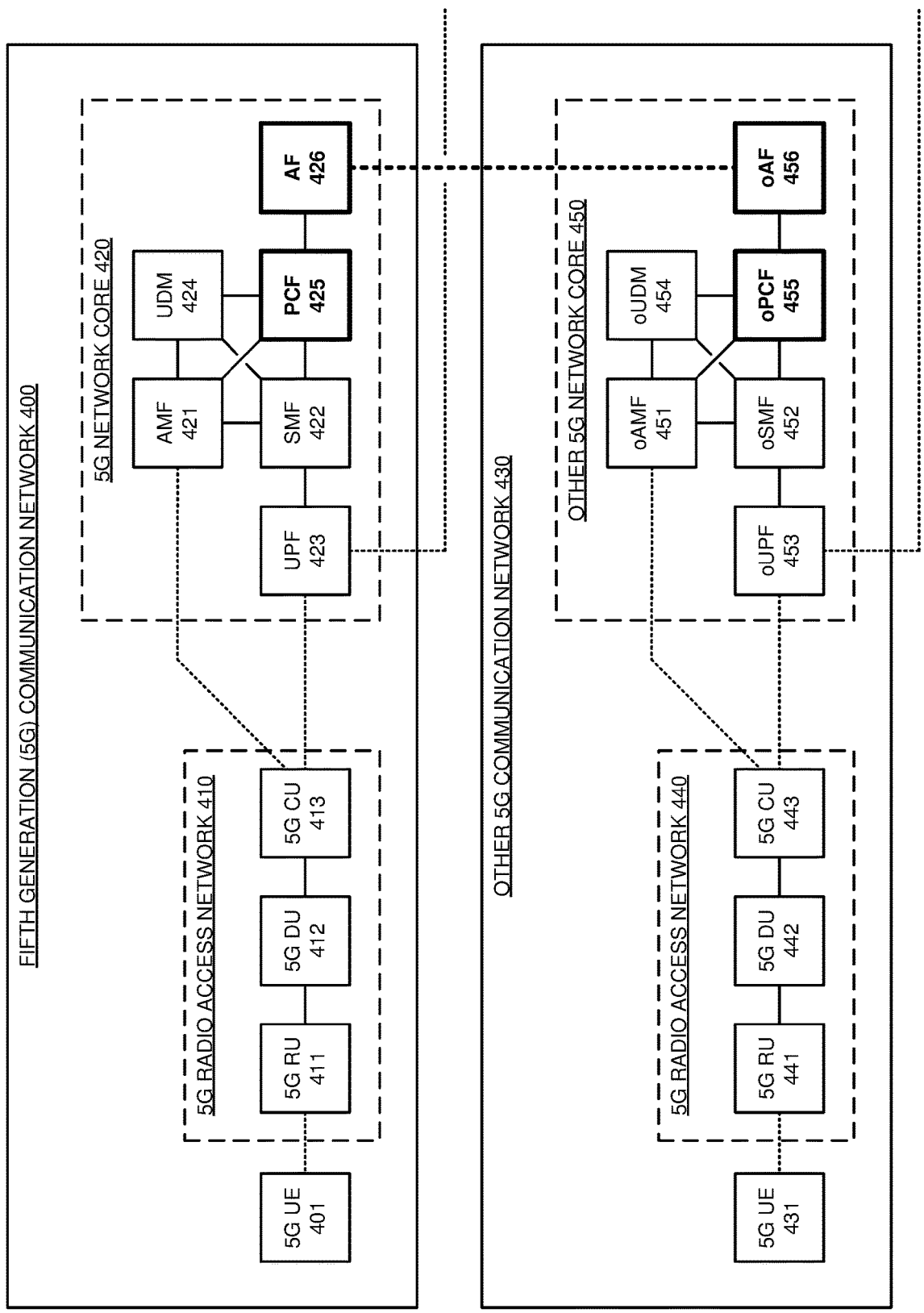
FIG. 4 illustrates a Fifth Generation (5G) communication network to enforce user policies across wireless communication networks.

FIG. 4 illustrates Fifth Generation (5G) communication network 400 to enforce user policies across wireless communication networks. 5G communication network 400 comprises an example of wireless communication network 100, although network 100 may differ. Other 5G communication network 430 comprises an example of other wireless communication network 130, although network 130 may differ. 5G communication network 400 comprises 5G UE 401, 5G RAN 410, and 5G network core 420. 5G UE 401 comprises a visiting UE from other 5G communication network 430 that is visiting on home 5G communication network 400. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Function (UPF) 423, Unified Data Management (UDM) 424, Policy Control Function (PCF) 425, and Application Function (AF) 426. Other 5G communication network 430 comprises 5G UE 431, 5G RAN 440, and 5G network core 450. 5G UE 431 comprises a visiting UE from 5G communication network 400 that is visiting on other 5G communication network 430. 5G RAN 440 comprises 5G RU 441, 5G DU 442, and 5G CU 443. Other 5G network core 450 comprises other Access and Mobility Management Function (oAMF) 451, other Session Management Function (oSMF) 452, other User Plane Function (oUPF) 453, other Unified Data Management (oUDM) 454, other Policy Control Function (oPCF) 455, and other Application Function (oAF) 456. Other network functions and network elements are typically present in network cores 420 and 450 but are omitted for clarity.

UE 401 wirelessly attaches to RU 411 and transfers attachment signaling to CU 413 over RU 411 and DU 412. The attachment signaling indicates a home Public Land Mobile Network (PLMN) ID for other 5G communication network 430 and a Subscription Concealed Identifier (SUCI) for UE 401. The PLMN ID indicates other 5G communications network 430 as the home network for UE 401. The SUCI is a privacy preserving identifier for UE 401 that conceals a Subscriber Permanent Identifier (SUPI) for UE 401. CU 413 transfers a registration request for UE 401 that indicates the PLMN ID and SUCI of UE 401 to AMF 421. AMF 421 interacts with other network functions to authenticate and authorize UE 401 for visiting data services. Responsive to the authentication and authorization, AMF 421 requests UE context for UE 401 from UDM 424. UDM 424 transfers default UE context for UE 401 to AMF 421 based on the roaming agreement between 5G communication network 400 and other 5G communication network 430. The UE context comprises default Quality-of-Service (QoS) metrics, default slice identifiers, and default network addresses in accordance with the roaming agreement. AMF 421 transfers the default UE context for UE 401 to CU 413. CU 413 transfers the default UE context to UE 401 over DU 412 and RU 411.

UE 401 wirelessly transfers a Protocol Data Unit (PDU) session request to CU 413 over RU 411 and DU 412. CU 413 transfers the PDU session request to AMF 421. AMF 421 queries PCF 425 for policy rules to support the PDU session requested by UE 401. PCF 425 drives AF 426 to retrieve service policies for UE 401 from other 5G communication network 430. AF 426 transfers a visiting service request that indicates the SUCI for UE 401 to oAF 456. oAF 456 notifies oPCF 455 of the service request. oPCF 455 identifies UE 401 based on the SUCI and interacts with oUDM 454 to retrieve the subscription profile for UE 401. The subscription profile indicates authorized services for UE 401. For example, the subscription profile may specify that UE 401 can use low-latency slice types. oUDM 454 transfers the subscription profile to oPCF 455. oPCF 455 indicates the authorized services for UE 401 to oAF 456.

oAF 456 receives the indication from oPCF 455. oAF 456 generates a policy template for UE 401. The policy template indicates the authorized services for UE 401 and is associated with the SUCI of UE 401 to conceal the identify of UE 401. For example, the policy template may indicate authorized slice types, an authorized QoS range, an authorized bit rate range, authorized times/locations, Local Breakout (LBO) rules, and other available services for UE 401. oAF 456 transfers the policy template for UE 401 to AF 426. AF 426 receives and processes the policy template and responsively generates a user policy for UE 401. The user policy comprises selected service values for UE 401 derived from the policy template. For example, AF 426 may identify that UE 401 is authorized to use guaranteed bit rate services and may generate a user policy that includes guaranteed bit rate services. AF 426 transfers the proposed user policy for UE 401 to oAF 456. oAF 456 transfers the user policy to oPCF 455. oPCF 455 processes the user policy and responsively approves the user policy for UE 401. For example, oPCF 455 may determine that the slice type and QoS level in the user policy for UE 401 are authorized by the subscription profile of UE 401. oPCF 455 transfers a policy approval to oAF 456 and oAF 456 forwards the policy approval to AF 426.

In response to the policy approval, AF 426 transfers the user policy for UE 401 to PCF 425. PCF 425 interacts with UDM 424 to update the UE context for UE 401 to enforce the user policy. For example, UDM 424 may update the QoS level for UE 401 in response to the interaction with PCF 425. PCF 425 approves the PDU session for UE 401 and directs AMF 421 to implement the user policy for UE 401. In response, AMF 421 retrieves the updated UE context for UE 401 from UDM 424. AMF 421 indicates the updated UE context for UE 401 to SMF 422 and directs SMF 422 to establish the PDU session for UE 401. SMF 422 selects UPF 423 to serve the PDU session to UE 401 based on the updated UE context. SMF 422 transfers session context to AMF 421. AMF 421 transfers the session context for the PDU session to CU 413. CU 413 transfers the session context to UE 401 over DU 412 and RU 411. UE 401 uses the session context to exchange user data for the PDU session with 5G network core 420. UE 401 exchanges user data for the PDU session with CU 413 over RU 411 and DU 412. CU 413 exchanges the user data for the PDU session with UPF 423. UPF 423 exchanges the user data for the PDU session with external networks.

AF 426 receives a visiting service request from oAF 456 that indicates the SUCI for UE 431. AF 426 identifies UE 431 based on the SUCI and notifies PCF 425 of the service request. PCF 425 interacts with UDM 424 to retrieve the subscription profile for UE 431. UDM 424 transfers the subscription profile to PCF 425. PCF 425 indicates the authorized services for UE 431 to AF 426. AF 426 receives the indication from PCF 425 and responsively generates a policy template for UE 431 that indicates authorized services for UE 431. AF 426 transfers the policy template for UE 431 to oAF 456. oAF 456 receives and processes the policy template and responsively generates a user policy that comprises selected service values based on the policy template for UE 401. oAF 456 transfers the proposed user policy for UE 431 to AF 426. AF 426 transfers the user policy to PCF 425. PCF 425 processes the user policy and responsively approves the user policy for UE 431. For example, PCF 425 may determine that the selected slice type for UE 431 is authorized by the subscription profile of UE 401. PCF 425 transfers a policy approval to AF 426. AF 426 transfers the policy approval to oAF 456.

In response to the policy approval, oAF 456 transfers the user policy for UE 431 to oPCF 455. oPCF 455 interacts with oUDM 454 and oAMF 451 to distribute the user policy for UE 431. oUDM 454 updates the UE context for UE 431 to enforce the user policy. oPCF 455 transfers a PDU session approval for UE 431 to oAMF 451. In response, oAMF 451 retrieves the updated UE context for UE 431 from oUDM 454. oAMF 451 directs oSMF 452 to establish the PDU session for UE 431 using the updated UE context. oSMF 452 selects oUPF 453 to serve the PDU session to UE 431 based on the updated UE context. oSMF 452 transfers session context to oAMF 451 and oAMF 451 transfers the session context for the PDU session to UE 431 over RAN 440. UE 431 exchanges user data for the PDU session with CU 443 over RU 441 and DU 442. CU 443 exchanges the user data for the PDU session with oUPF 453. oUPF 453 exchanges the user data for the PDU session with external networks.

In some examples, PCF 425 may transfer user policy audit requests to oPCF 455 to determine service metrics for UE 431. PCF 425 generates an audit request to retrieve the policy template for UE 431. PCF 425 transfers the audit request to AF 426. AF 426 transfers the audit request to oAF 456 and indicates the SUCI for UE 431. oAF 456 processes the SUCI for UE 431 and responsively identifies the policy template for UE 431. oAF 456 transfers the policy template for UE 431 to AF 426 and AF 426 forwards the policy template to PCF 425. PCF processes the user template and determines if the policy template values are sufficient for UE 431. For example, PCF 424 may determine if the policy template indicates authorized slice types, an authorized QoS range, an authorized bit rate range, authorized times/locations, and other service metrics for UE 431. In some examples, AF 426 receives audit requests from oAF 456 for the policy template for UE 401. AF 426 uses the SUCI for UE 401 to identify the policy template for UE 401 and transfers the policy template to oAF 456. oAF 456 transfers the policy template to oPCF 455. In a similar manner as PCF 425, oPCF 455 processes the user template for UE 401 to determine if the template values are sufficient.

Figure 5:
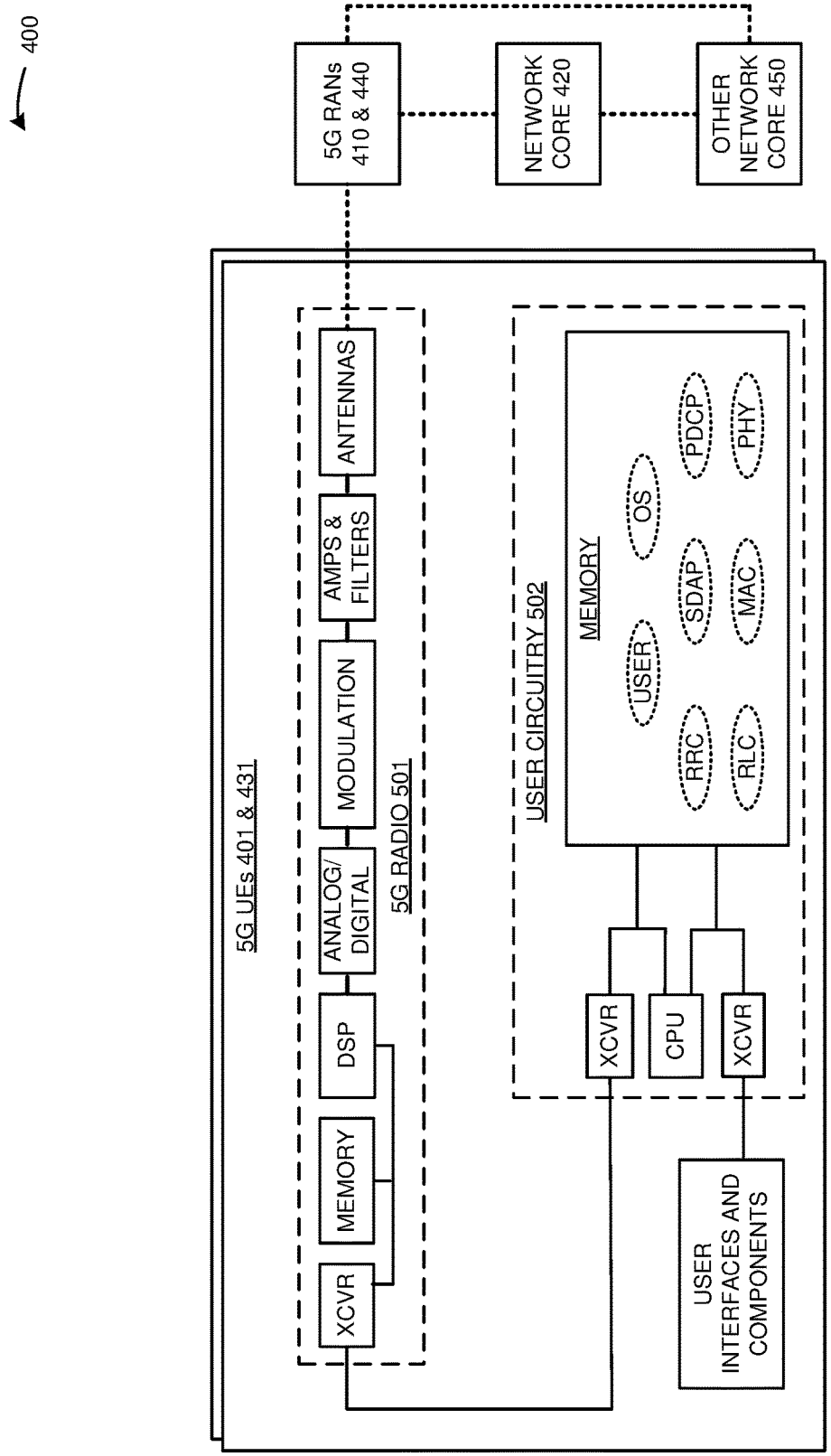
FIG. 5 illustrates the 5G UEs in the 5G communication networks.

FIG. 5 illustrates 5G UEs 401 and 431 that are served PDU sessions based on visiting user policies. UE 401 comprises an example of UE 101, although UE 101 may differ. UE 431 comprises an example of UE 131, although UE 131 may differ. UEs 401 and UE 431 comprise 5G radio 501 and user circuitry 502. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 510 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RANs 410 and 440 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 410 and 440 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication, RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
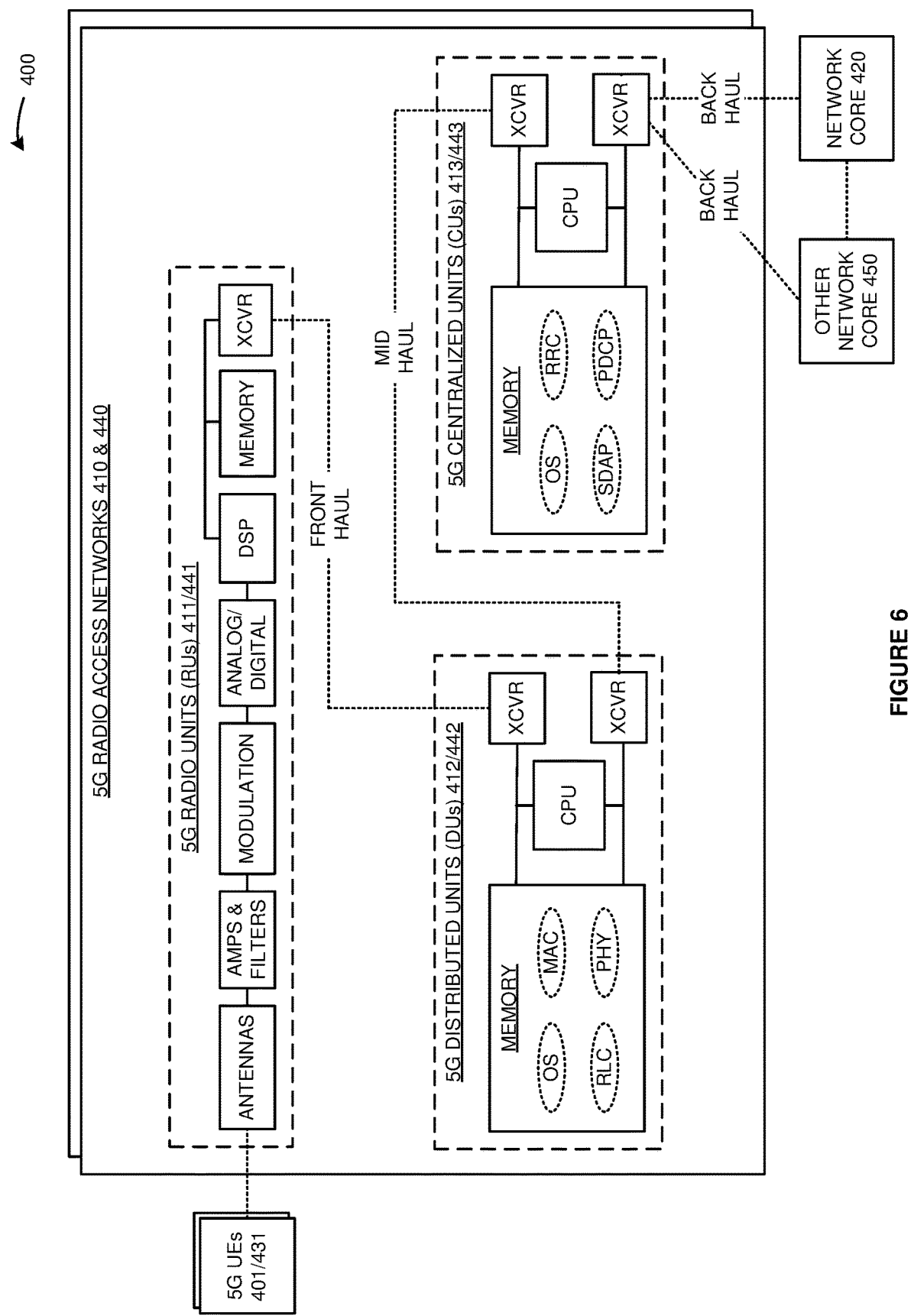
FIG. 6 illustrates 5G RANs in the 5G communication networks.

FIG. 6 illustrates 5G RUs 411 and 441, 5G DUs 412 and 442, and 5G CUs 413 and 443 that serve PDU based on visiting user policies. RU 411, DU 412, and CU 413 comprise an example of RAN 111, although RAN 111 may differ. RU 441, DU 442, and CU 443 comprise an example of RAN 141, although RAN 141 may differ. RUs 411 and 441 comprises antennas, amplifiers, filters, modulation, analog-to-digital interfaces, DSP, memory, and transceivers (XCVRs) that are coupled over bus circuitry. UE 401 is wirelessly coupled to the antennas in RU 411 over 5GNR links. UE 431 is wirelessly coupled to antennas in RU 441 over 5GNR links. Transceivers in 5G RU 411 are coupled to transceivers in 5G DU 412 and transceivers in 5G RU 441 are coupled to transceivers in 5G RU 442 over fronthaul links like enhanced Common Public Radio Interface (eC-PRI). The DSPs in RUs 411 and 441 execute their operating systems and radio applications to exchange 5GNR signals with UEs 401 and 431 and to exchange 5GNR data units with DUs 412 and 442.

For the uplink, the antennas receive wireless signals from UEs 401 and 431 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DUs 412 and 442 over the transceivers.

For the downlink, the DSPs receive downlink 5GNR symbols from DUs 412 and 442. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UEs 401 and 431 that transport the downlink 5GNR signaling and data.

DUs 412 and 442 comprises memory, CPU, and transceivers that are coupled over bus circuitry. The memory in 5G DUs 412 and 442 stores operating systems and 5GNR network applications like PHY, MAC, and RLC. CUs 413 and 443 comprise memory, CPU, and transceivers that are coupled over bus circuitry. The memory in CUs 413 and 443 store an operating system and 5GNR network applications like PDCP, SDAP, and RRC. Transceivers in 5G DUs 412 and 442 are coupled to transceivers in RUs 411 and 441 over front-haul links. Transceiver in DUs 412 and 442 are coupled to transceivers in CUs 413 and 443 over mid-haul links. A transceiver in CU 413 is coupled to network core 420 over backhaul links. A transceiver in CU 443 is coupled to other network core 450 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
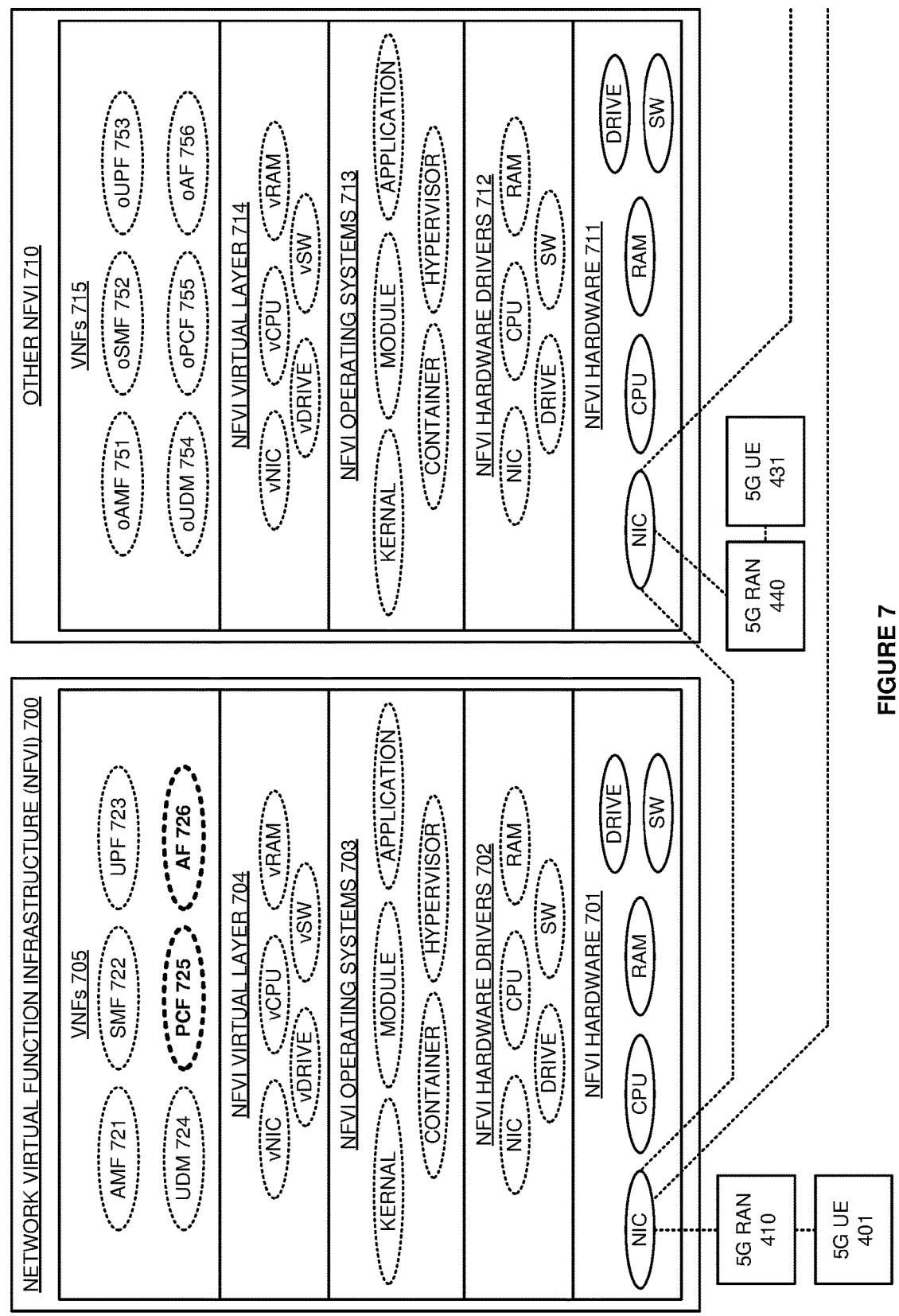
FIG. 7 illustrates Network Function Virtualization Infrastructure (NFVIs) in the 5G communication networks.

FIG. 7 illustrates Network Function Virtualization Infrastructure (NFVI) 700 and other NFVI 710. NFVI 700 comprises an example of network functions 121-123, although functions 121-123 may vary from this example. Other NFVI 710 comprises an example of network functions 151-153, although functions 151-153 may vary from this example. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 721, SMF 722, UPF 723, UDM 724, PCF 725, and AF 726. Additional VNFs and network elements like Authentication Server Function (AUSF), Network Slice Selection Function (NSSF), Unified Data Registry (UDR), and Network Exposure Function (NEF) are typically present but are omitted for clarity. NFVI 700 may be located at a single site or be distributed across multiple geographic locations. The NIC in NFVI hardware 701 is coupled to 5G RAN 410, to a NIC in NFVI hardware 711, and to external systems. NFVI hardware 701 executes NFVI hardware drivers 702, NFVI operating systems 703, NFVI virtual layer 704, and NFVI VNFs 705 to form AMF 421, SMF 422, UPF 423, UDM 424, PCF 425, and AF 426.

In a like manner, other NFVI 710 comprises NFVI hardware 711, NFVI hardware drivers 712, NFVI operating systems 713, NFVI virtual layer 714, and NFVI VNFs 715. NFVI hardware 711 comprises NICs, CPU, RAM, DRIVE, and SW. NFVI hardware drivers 712 comprise software that is resident in the NIC, CPU, RAM, DRIVE, and SW. NFVI operating systems 713 comprise kernels, modules, applications, containers, hypervisors, and the like. NFVI virtual layer 714 comprises vNIC, vCPU, vRAM, vDRIVE, and vSW. NFVI VNFs 705 comprise oAMF 751, oSMF 752, oUPF 753, oUDM 754, oPCF 755, and oAF 756. Additional VNFs and network elements are typically present but are omitted for clarity. Other NFVI 710 may be located at a single site or be distributed across multiple geographic locations. The NIC in NFVI hardware 711 is coupled to 5G RAN 440, to a NIC in NFVI hardware 701, and to external systems. NFVI hardware 711 executes NFVI hardware drivers 712, NFVI operating systems 713, NFVI virtual layer 714, and NFVI VNFs 715 to form oAMF 451, oSMF 452, oU5F 423, oUDM 454, oPCF 455, and oAF 456.

Figure 8:
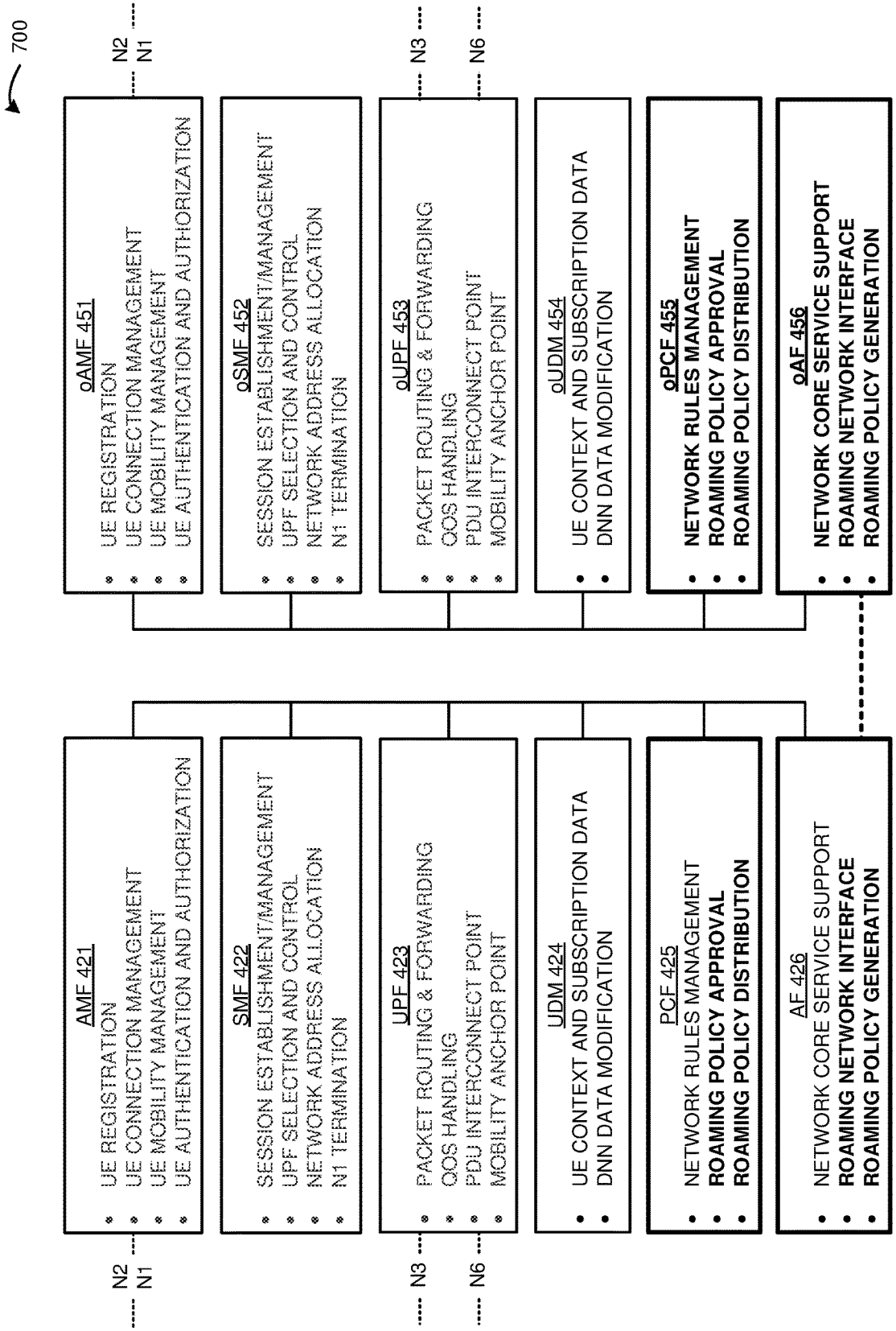
FIG. 8 further illustrates the NFVIs in the 5G communication networks.

FIG. 8 further illustrates NFVI 700 and other NFVI 710 in 5G communication networks 400 and 430. AMP 421 performs UE registration and connection. UE connection/mobility management, and UE authentication and authorization. SMF 422 performs session establishment and management, UPF selection and control, network address allocation, and N1 termination. UPF 423 performs packet routing & forwarding, packet inspection, QoS handling, PDU interconnection, and mobility anchoring. UDM 424 performs LIE context management, UE subscription management, and DNN data modification. PCF 425 performs network rules management, visiting policy approval, and visiting policy distribution. AF 426 performs network core service support, visiting network interfacing, and visiting policy generation. in a like manner, other NFs 451-456 perform similar functions to NE's 421-426.

In this example, 5G communication network 400 enforces a user policy for a QoS level for UE 401 and directs 5G communication network 430 to enforce a user policy for a QoS level and LBO rule for UE 431, however the user policies may differ in other examples. AMF 421 receives a PDU session request from UE 401. AMF 421 interacts with PCF 425 to determine if the PDU session requested by UE 401 is supported. In response, PCF 425 directs AF 426 to retrieve service policies for UE 401 from other 5G communication network 430. AF 426 transfers a visiting service request that indicates SUCI of UE 401 to oAF 456. oAF 456 identifies UE 401 based on the SUCI and transfers the service request to oPCF 455. oPCF 455 retrieves the subscription profile for UE 401 from oUDM 454. oPCF 455 determines that UE 401 is authorized for a range of QoS levels and indicates the authorized QoS range for UE 401 to oAF 456.

oAF 456 receives the indication and generates a policy template for UE 401 that indicates the range of QoS levels for UE 401. For example, oAF 456 may update the template to include the range of QoS levels for UE 401 while leaving other template values (e.g., slice type) at defaults. oAF 456 transfers the policy template for UE 401 to AF 426. AF 426 responsively generates a user policy for UE 401 that includes a QoS level within the authorized range. AF 426 transfers the proposed user policy for UE 401 to oPCF 455 over oAF 456. oPCF 455 approves the user policy for the QoS level for UE 401. oPCF 455 transfers a policy approval to AF 426 over oAF 456.

In response to the policy approval, AF 426 transfers the user policy for the QoS level for UE 401 to PCF 425. PCF 425 directs UDM 424 to update the UE context for UE 401 to include the QoS level. PCF 425 approves the PDU session for UE 401 and directs AMF 421 to enforce the user policy for the QoS level for UE 401. AMF 421 retrieves the updated UE context for UE 401 from UDM 424. AMF 421 directs SMF 422 to establish the PDU session for UE 401 using the updated QoS level. SMF 422 selects UPF 423 to serve the PDU session to UE 401 at the updated QoS level. SMF 422 transfers session context to AMF 421 that indicates UPF 423. AMF 421 transfers the session context for the PDU session to UE 401 over RAN 410. UPF 423 exchanges user data for the PDU session with UE 401 over RAN 410 at the QoS level. UPF 423 exchanges the user data for the PDU session with external networks.

AF 426 receives a visiting service request for UE 431 from oAF 456. The service request indicates the SUCI for UE 431 and that UE 431 requested a PDU session over other 5G communication network 430. AF 426 uses the SUCI to identify UE 431 and notifies PCF 425 of the service request for UE 431. PCF 425 retrieves subscription information for UE 431 from UDM 424. PCF 425 determines a range of QoS levels that UE 431 is authorized for and determines an LBO rule for UE 431. PCF 425 indicates the range of QoS levels and LBO rule for UE 431 to AF 426. AF 426 receives the indication from PCF 425. AF 426 generates a policy template for UE 431 that indicates the range of QoS levels and LBO rule for UE 431 and indicates default values for other template values. AF 426 transfers the policy template for UE 431 to oAF 456. oAF 456 processes the policy template and responsively generates a user policy that comprises a QoS level within the indicated range and that implements the LBO rule. oAF 456 transfers the proposed user policy to PCF 425 over AF 426. PCF 425 approves the user policy for the QoS level and LBO rule for UE 431. PCF 425 transfers a policy approval to oAF 456 over AF 426.

oAF 456 transfers the user policy for UE 431 to oPCF 455. oPCF 455 distributes the user policy for UE 431 to oUDM 454 and oAMF 451. oUDM 454 updates the UE context for UE 431 to include the QoS level and LBO rule. oPCF 455 approves a PDU session request from oAMF 451 for UE 431. In response, oAMF 451 retrieves the updated UE context for UE 431 from oUDM 454. oAMF 451 directs oSMF 452 to establish the PDU session for UE 431 at the updated QoS level and to implement the LBO rule for UE 431. oSMF 452 selects oUPF 453 to serve the PDU session to UE 431 at the updated QoS level. oSMF 452 transfers session context to oAMF 451. oAMF 451 transfers the session context for the PDU session to UE 431 over RAN 440. oUPF 453 exchanges user data for the PDU session with UE 431 over RAN 440 at the updated QoS level. oUPF 453 exchanges the user data for the PDU session with external networks.

Figure 9:
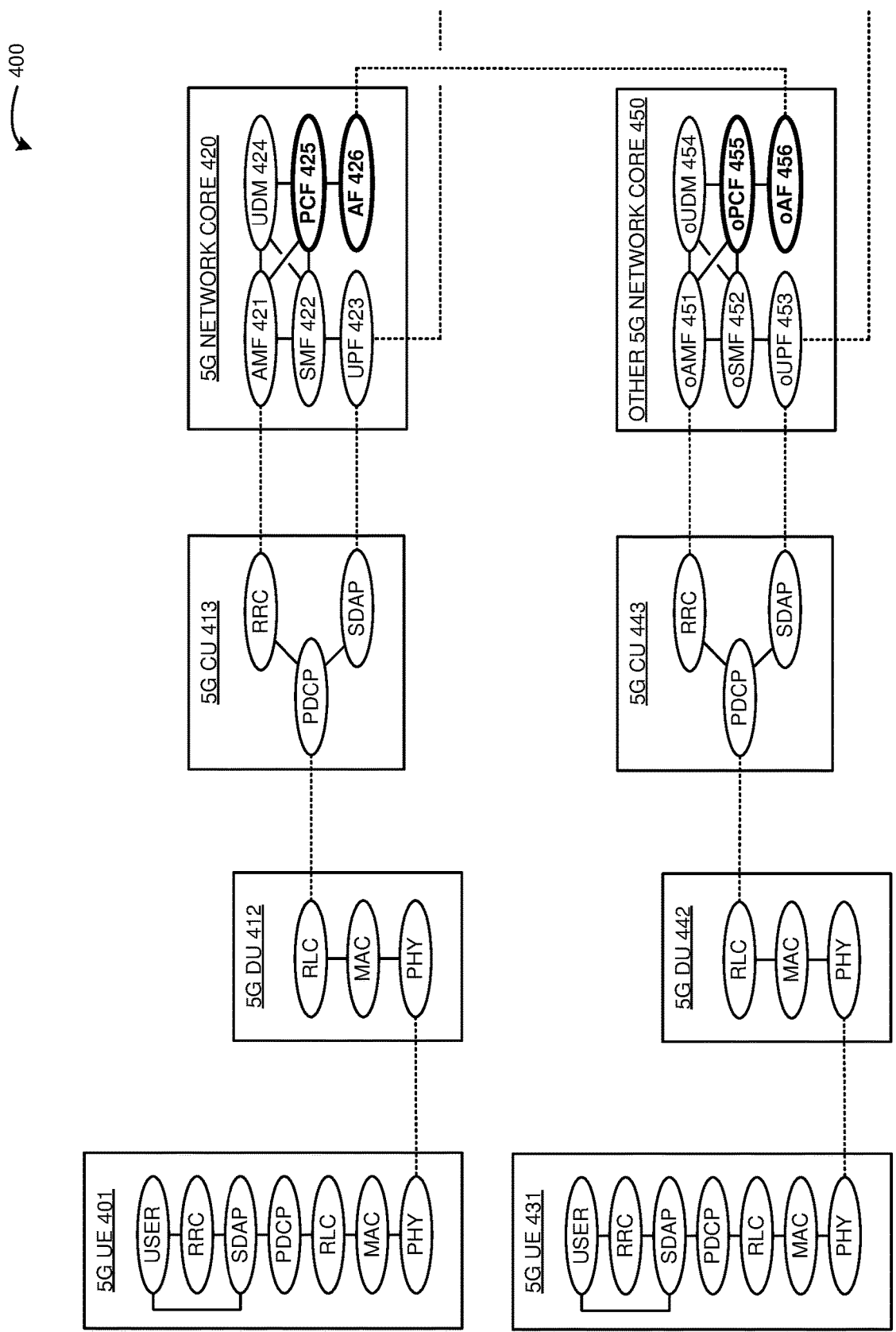
FIG. 9 illustrates an exemplary operation of the 5G communication network to enforce user policies across wireless communication networks.

FIG. 9 illustrates an exemplary operation of 5G communication network 400 to enforce user policies across wireless communication networks. The operation may vary in other examples. In this example, 5G communication network 400 enforces a user policy for a low latency slice type for UE 401 and directs 5G communication network 430 to enforce a user policy for a high throughput slice type for UE 431, however the user policies may differ in other examples.

The RRC in UE 401 attaches to the RRC in CU 413 over the PDCPs, RLCs, MACs, and PHYs. The RRC in UE 401 transfers a PLMN ID and SUCI for UE 401 to the RRC in CU 413 over the PDCPs, RLCs, MACs, and PHYs. The RRC in CU 413 transfers a registration request for UE 401 that indicates the PLMN ID and SUCI of UE 401 to AMF 421. AMF 421 interacts with other network functions to authenticate and authorize UE 401 for visiting data services. AMF 421 determines UE 401 is visiting from other 5G communication network 430 based on the PLMN ID. Responsive to the authentication and authorization, AMF 421 transfers a context request for UE 401 to UDM 424 and indicates UE 401 is visiting from other 5G communication network 430. UDM 424 transfers default UE context per the roaming agreement between networks 400 and 430 to AMF 421. The UE context comprises default QoS, default slice IDs, and default network addresses. AMF 421 transfers the default UE context for UE 401 to the RRC in CU 413. The RRC in CU 413 transfers the default UE context to the RRC in UE 401 over the PDCPs, RLCs, MACs, and PHYs.

A user application in UE 401 executes and the RRC in UE 401 wirelessly transfers a PDU session request to the RRC in CU 413 over the PDCPs, RLCs, MACs, and PHYs. The RRC in CU 413 transfers the PDU session request to AMF 421. AMF 421 queries PCF 425 for policy rules to support the requested PDU session requested. PCF 425 directs AF 426 to retrieve service policies for UE 401 from other 5G communication network 430. AF 426 indicates the SUCI for UE 401 and transfers a visiting service request for UE 401 to oAF 456. oAF 456 notifies oPCF 455 of the service request and SUCI for UE 401. oPCF 455 identifies UE 401 based on the SUCI for UE 401 and interacts with oUDM 454 to identify authorized services for UE 401. oPCF 455 responsively determines that UE 401 is authorized for low-latency slice types. oPCF 455 indicates that UE 401 is authorized for low-latency slice types to oAF 456.

oAF 456 receives the indication from oPCF 455 and generates a policy template for UE 401 that comprises low-latency slice types for UE 401. oAF 456 transfers the policy template for UE 401 to AF 426. AF 426 processes the policy template and responsively generates a user policy based on the policy template. The proposed user policy includes a low-latency slice type for UE 401. AF 426 transfers the proposed user policy for UE 401 to oPCF 455 over oAF 456. oPCF 455 processes the user policy and responsively approves the proposed low-latency slice type for the user policy for UE 401. oPCF 455 transfers a policy approval to oAF 456. oAF 456 transfers the policy approval to AF 426.

In response to the policy approval, AF 426 transfers the user policy for the low-latency slice type for UE 401 to PCF 425. PCF 425 directs UDM 424 to update the UE context for UE 401 to include the low-latency slice type. PCF 425 approve the PDU session for UE 401 and directs AMF 421 to implement the user policy for UE 401. In response, AMF 421 retrieves the updated UE context for UE 401 from UDM 424. AMF 421 transfers the updated UE context for UE 401 to SMF 422. AMF 421 directs SMF 422 to establish the PDU session for UE 401 on a low-latency slice. SMF 422 selects UPF 423 to serve the PDU session to UE 401 on the low-latency slice based on the updated UE context. SMF 422 transfers session context that indicates UPF 423 to AMF 421. AMF 421 transfers the session context for the PDU session to the RRC in CU 413. The RRC in CU 413 transfers the session context to the RRC in UE 401 over the PDCPs, RLCs, MACs, and PHYs. The RRC in UE 401 directs the SDAP in UE 401 to initiate the PDU session based on the session context. The SDAP in UE 401 exchanges low latency user data for the PDU session with the SDAP in CU 413 over the PDCPs, RLCs, MACs, and PHYs. The SDAP in CU 413 exchanges the low-latency user data for the PDU session with UPF 423. UPF 423 exchanges the low-latency user data for the PDU session with external networks.

AF 426 receives a visiting service request from oAF 456. The visiting service request indicates the SUCI and a PDU session request for UE 431. AF 426 identifies UE 431 based on the SUCI and transfers the service request to PCF 425. PCF 425 retrieves authorized services for UE 431 from UDM 424 and determines that UE 431 is authorized for high throughput slice types. PCF 425 indicates that UE 431 is authorized for high throughput slice types to AF 426. AF 426 responsively generates a policy template for UE 431 that indicates UE 431 is authorized for high throughput slice types. AF 426 transfers the policy template for UE 431 to oAF 456. oAF 456 processes the policy template and responsively generates a user policy that comprises a high throughput slice type for UE 431. oAF 456 transfers the proposed user policy for UE 431 to PCF 425 over AF 426. PCF 425 processes the user policy and responsively approves the proposed high-throughput slice type for UE 431. PCF 425 transfers a policy approval to oAF 456 over AF 426.

In response to the policy approval, oAF 456 transfers the user policy for UE 431 to oPCF 455. oPCF 455 distributes the user policy for UE 431 to oUDM 454 and oAMF 451. oUDM 454 updates the UE context for UE 431 to include the high throughput slice type. oPCF 455 approves a high throughput PDU session for UE 431. In response, oAMF 451 retrieves the updated UE context for UE 431 from oUDM 454. oAMF 451 directs oSMF 452 to establish the PDU session for UE 431 on a high throughput slice. oSMF 452 selects oUPF 453 to serve the PDU session to UE 431 on the high throughput slice. oSMF 452 transfers session context to oAMF 451. oAMF 451 transfers the session context for the PDU session to the RRC in CU 443. The RRC in CU 443 transfers the session context to the RRC in UE 431 over the PDCPs, RLCs, MACs, and PHYs. The RRC UE 431 directs the SDAP in UE 431 to begin the PDU session. The SDAP in UE 431 exchanges user data for the PDU session with the SDAP in CU 443 over the PDCPs, RLCs, MACs, and PHYs. The SDAP in CU 443 exchanges the user data for the PDU session with oUPF 453. oUPF 453 exchanges the user data for the PDU session with external networks.

The wireless data network circuitry described above comprises computer hardware and software that form special-purpose network circuitry to enforce a user policy for a UE and to direct another wireless communication network to enforce another user policy for another UE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Due to this automated execution, the presence of the higher-level software in memory physically changes the structure of the computer hardware machines into special-purpose network circuitry to enforce the user policy for the UE and to direct the other wireless communication network to enforce the other user policy for the other UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network comprising an Application Function (AF) and a Policy Control Function (PCF) to enforce user policies for multiple a User Equipment (UE), the method comprising:
   the AF receiving a user policy from an other AF in an other wireless communication network for a visiting User Equipment (UE) from the other wireless communication network and transferring the user policy to the PCF wherein the other AF received the user policy from an other PCF in the other wireless communication network;
   the PCF receiving the user policy from the AF and distributing the user policy to a Network Function (NF);
   the NF enforcing the user policy for the visiting UE;
   the PCF accessing a Unified Data Management (UDM), identifying an other user policy for an other UE visiting on the other wireless communication network, and transferring the other user policy to the AF; and
   the AF receiving the other user policy from the PCF and responsively transferring the other user policy to the other AF, wherein the other AF receives the other user policy and responsively transfers the other user policy to the other PCF and the other PCF receives the other user policy and responsively distributes the other user policy to an other NF in the other wireless communication network and the other NF receives the other user policy and responsively enforces the other user policy for the other User Equipment (UE) visiting on the other wireless communication network.

2. The method of claim 1 wherein the AF receiving the user policy from the other AF comprises the AF receiving and processing a policy type from the other AF, and in response, generating the user policy.

3. The method of claim 1 wherein the AF receiving the user policy from the other AF comprises:
   the AF receiving and processing a policy type from the other AF, and in response, generating the user policy and transferring the user policy to the other AF wherein the other AF transfers the user policy to the other PCF and the other PCF receives and processes the user policy, approves the user policy, and responsively transfers a policy approval to the other AF and the other AF receives the policy approval and responsively transfers the policy approval to the AF; and
   the AF receiving the policy approval and in response, transferring the user policy to the PCF.

4. The method of claim 1 wherein the AF receiving the user policy from the other AF comprises:

the AF receiving and processing the policy type for the visiting UE from the other AF, and in response, generating the user policy for the visiting UE and transferring the user policy for the visiting UE to the other AF wherein the other AF transfers the user policy for the visiting UE to the other PCF and the other PCF receives and processes the user policy for the visiting UE, approves the user policy for the visiting UE, and responsively transfers a policy approval for the user policy for the visiting UE to the other AF and the other AF receives the policy approval for the user policy for the visiting UE and responsively transfers the policy approval user policy for the visiting UE to the AF; and the AF receiving the policy approval for the user policy for the visiting UE and in response, transferring the user policy for the visiting UE to the PCF.

5. The method of claim 1 wherein the AF receiving the user policy from the other AF comprises:

the AF receiving and processing a slice type for the visiting UE from the other AF, and in response, generating the user policy for the slice type for the visiting UE and transferring the user policy for the slice type for the visiting UE to the other AF wherein the other AF transfers the user policy for the slice type for the visiting UE to the other PCF and the other PCF receives and processes the user policy for the slice type for the visiting UE, approves the user policy for the slice type for the visiting UE, and responsively transfers a policy approval for the slice type for the visiting UE to the other AF and the other AF receives the policy approval for the slice type for the visiting UE and responsively transfers the policy approval for the slice type for the visiting UE to the AF; and the AF receiving the policy approval for the slice type for the visiting UE and in response, transferring the user policy for the slice type for the visiting UE to the PCF.

6. The method of claim 1 wherein the AF transferring the other user policy to the other AF comprises transferring a policy type to the other AF, wherein the other AF receives and processes the policy type, and in response, generates the other user policy.

7. The method of claim 1 wherein the AF transferring the other user policy to the other AF comprises:

the AF transferring a policy type to the other AF, wherein the other AF processes the policy type, and in response, generates the other user policy and transfers the other user policy to the AF;

the AF receiving the other user policy from the other AF and transferring the other user policy to the PCF;

the PCF receiving and processing the other user policy, approving the other user policy, and responsively transferring a policy approval for the other user policy to the AF; and the AF transferring the policy approval for the other user policy to the other AF wherein the other AF receives the policy approval and responsively transfers the other user policy to the other PCF and the other PCF distributes the other policy to the other NF and the other NF enforces the other user policy.

8. The method of claim 1 wherein the AF transferring the other user policy to the other AF comprises:

the AF transferring a policy type for the other UE to the other AF, wherein the other AF processes the policy type for the other UE, and in response, generates the other user policy for the other UE and transfers the other user policy for the other UE to the AF;

the AF receiving the other user policy for the other UE from the other AF and transferring the other user policy for the other UE to the PCF;

the PCF receiving and processing the other user policy for the other UE, approving the other user policy for the other UE, and responsively transferring a policy approval for the other user policy for the other UE to the AF; and the AF transferring the policy approval for the other user policy for the other UE to the other AF wherein the other AF receives the policy approval for the other user policy for the other UE and responsively transfers the other user policy for the other UE to the other PCF and the other PCF distributes the other policy for the other UE to the other NF and the other NF enforces the other user policy for the other UE.

9. The method of claim 1 wherein the AF transferring the other user policy to the other AF comprises:

the AF transferring a slice type for the other UE to the other AF, wherein the other AF processes the slice type for the other UE, and in response, generates the other user policy for the slice type for the other UE and transfers the other user policy for the slice type for the other UE to the AF;

the AF receiving the other user policy for the slice type for the other UE from the other AF and transferring the other user policy for the slice type for the other UE to the PCF;

the PCF receiving and processing the other user policy for the slice type for the other UE, approving the other user policy for the slice type for the other UE, and responsively transferring a policy approval for the other user policy for the slice type for the other UE to the AF; and the AF transferring the policy approval for the other user policy for the slice type for the other UE to the other AF wherein the other AF receives the policy approval for the other user policy for the slice type for the other UE and responsively transfers the other user policy for the slice type for the other UE to the other PCF and the other PCF distributes the other policy for the slice type for the other UE to the other NF and the other NF enforces the other user policy for the slice type for the other UE.

10. The method of claim 1 wherein the user policy comprises a Local Breakout (LBO) rule for the visiting UE and the other user policy comprises an LBO rule for the other UE visiting on the other wireless communication network.

11. A wireless communication network configured to enforce user policies for multiple User Equipment (UE), the wireless communication network comprising:

an Application Function (AF) and a Policy Control Function (PCF);

the AF configured to receive a user policy from an other AF in an other wireless communication network for a visiting User Equipment (UE) from the other wireless communication network and transfer the user policy to the PCF wherein the other AF received the user policy from an other PCF in the other wireless communication network;

the PCF configured to receive the user policy from the AF and distribute the user policy to a Network Function (NF);

the NF configured to enforce the user policy for the visiting UE;

the PCF configured to access a Unified Data Management (UDM), identify an other user policy for an other UE visiting on the other wireless communication network, and transfer the other user policy to the AF; and the AF configured to receive the other user policy from the PCF and responsively transfer the other user policy to the other AF, wherein the other AF receives the other user policy and responsively transfers the other user policy to the other PCF and the other PCF receives the other user policy and responsively distributes the other user policy to an other NF in the other wireless communication network and the other NF receives the other user policy and responsively enforces the other user policy for the other User Equipment (UE) visiting on the other wireless communication network.

12. The wireless communication network of claim 11 wherein the AF is configured to receive the user policy from the other AF comprises the AF configured to receive and process a policy type from the other AF, and in response, generate the user policy.

13. The wireless communication network of claim 11 wherein the AF is configured to receive the user policy from the other AF comprises:

the AF configured to receive and process a policy type from the other AF, and in response, generate the user policy and transfer the user policy to the other AF wherein the other AF transfers the user policy to the other PCF and the other PCF receives and processes the user policy, approves the user policy, and responsively transfers a policy approval to the other AF and the other AF receives the policy approval and responsively transfers the policy approval to the AF; and the AF configured to receive the policy approval and in response, transfer the user policy to the PCF.

14. The wireless communication network of claim 11 wherein the AF is configured to receive the user policy from the other AF comprises:

the AF configured to receive and process the policy type for the visiting UE from the other AF, and in response, generate the user policy for the visiting UE and transfer the user policy for the visiting UE to the other AF wherein the other AF transfers the user policy for the visiting UE to the other PCF and the other PCF receives and processes the user policy for the visiting UE, approves the user policy for the visiting UE, and responsively transfers a policy approval for the user policy for the visiting UE to the other AF and the other AF receives the policy approval for the user policy for the visiting UE and responsively transfers the policy approval user policy for the visiting UE to the AF; and the AF configured to receive the policy approval for the user policy for the visiting UE and in response, transfer the user policy for the visiting UE to the PCF.

15. The wireless communication network of claim 11 wherein the AF is configured to receive the user policy from the other AF comprises:

the AF configured to receive and process a slice type for the visiting UE from the other AF, and in response, generate the user policy for the slice type for the visiting UE and transfer the user policy for the slice type for the visiting UE to the other AF wherein the other AF transfers the user policy for the slice type for the visiting UE to the other PCF and the other PCF receives and processes the user policy for the slice type for the visiting UE, approves the user policy for the slice type for the visiting UE, and responsively transfers a policy approval for the slice type for the visiting UE to the other AF and the other AF receives the policy approval for the slice type for the visiting UE and responsively transfers the policy approval for the slice type for the visiting UE to the AF; and the AF configured to receive the policy approval for the slice type for the visiting UE and in response, transfer the user policy for the slice type for the visiting UE to the PCF.

16. The wireless communication network of claim 11 wherein the AF is configured to transfer the other user policy to the other AF comprises the AF configured to transfer a policy type to the other AF, wherein the other AF receives and processes the policy type, and in response, generates the other user policy.

17. The wireless communication network of claim 11 wherein the AF is configured to transfer the other user policy to the other AF comprises:

the AF configured to transfer a policy type to the other AF, wherein the other AF processes the policy type, and in response, generates the other user policy and transfers the other user policy to the AF;

the AF configured to receive the other user policy from the other AF and transfer the other user policy to the PCF;

the PCF configured to receive and process the other user policy, approve the other user policy, and responsively transfer a policy approval for the other user policy to the AF; and the AF configured to receive the policy approval for the other user policy from the PCF and transfer the policy approval for the other user policy to the other AF wherein the other AF receives the policy approval and responsively transfers the other user policy to the other PCF and the other PCF distributes the other policy to the other NF and the other NF enforces the other user policy.

18. The wireless communication network of claim 11 wherein the AF is configured to transfer the other user policy to the other AF comprises:

the AF configured to transfer a policy type for the other UE to the other AF, wherein the other AF processes the policy type for the other UE, and in response, generates the other user policy for the other UE and transfers the other user policy for the other UE to the AF;

the AF configured to receive the other user policy for the other UE from the other AF and transfer the other user policy for the other UE to the PCF;

the PCF configured to receive and process the other user policy for the other UE, approve the other user policy for the other UE, and responsively transfer a policy approval for the other user policy for the other UE to the AF; and the AF configured to receive the policy approval for the other user policy for the other UE from the PCF and transfer the policy approval for the other user policy for the other UE to the other AF wherein the other AF receives the policy approval for the other user policy for the other UE and responsively transfers the other user policy for the other UE to the other PCF and the other PCF distributes the other policy for the other UE to the other NF and the other NF enforces the other user policy for the other UE.

19. The wireless communication network of claim 11 wherein the AF is configured to transferring the other user policy to the other AF comprises:

the AF configured to transfer a slice type for the other UE to the other AF, wherein the other AF processes the slice type for the other UE, and in response, generates the other user policy for the slice type for the other UE and transfers the other user policy for the slice type for the other UE to the AF;

the AF configured to receive the other user policy for the slice type for the other UE from the other AF and transfer the other user policy for the slice type for the other UE to the PCF;

the PCF configured to receive and process the other user policy for the slice type for the other UE, approve the other user policy for the slice type for the other UE, and responsively transfer a policy approval for the other user policy for the slice type for the other UE to the AF; and the AF configured to receive the policy approval for the other user policy for the slice type for the other UE from the PCF and transfer the policy approval for the other user policy for the slice type for the other UE to the other AF wherein the other AF receives the policy approval for the other user policy for the slice type for the other UE and responsively transfers the other user policy for the slice type for the other UE to the other PCF and the other PCF distributes the other policy for the slice type for the other UE to the other NF and the other NF enforces the other user policy for the slice type for the other UE.

20. The wireless communication network of claim 11 wherein the user policy comprises a Local Breakout (LBO) rule for the visiting UE and the other user policy comprises an LBO rule for the other UE visiting on the other wireless communication network.

* * * * *